Aug. 16, 1955     O. C. WRIGHT     2,715,320
AIR CONDITING SYSTEM

Filed Nov. 3, 1951     2 Sheets-Sheet 1

INVENTOR.
Owen C. Wright
BY
Chester Mueller
ATTORNEY

Aug. 16, 1955 O. C. WRIGHT 2,715,320
AIR CONDITING SYSTEM

Filed Nov. 3, 1951 2 Sheets-Sheet 2

INVENTOR.
Owen C. Wright
BY Chester Mueller
ATTORNEY

United States Patent Office 2,715,320
Patented Aug. 16, 1955

2,715,320

AIR CONDITIONING SYSTEM

Owen C. Wright, Millburn, N. J.

Application November 3, 1951, Serial No. 254,667

1 Claim. (Cl. 62—6)

This invention relates to the control of humidity and temperature in an air conditioned space by means of heat generated in the cooling system.

Many smaller air conditioning systems currently in use make no provision for controlling the humidity within the space they keep cool. That is they function solely on temperature changes; when temperature in the space rises to a certain point the system is activated and by means of a refrigerating apparatus the temperature is brought down to a previously determined level at which time the system is inactivated. On the other hand larger air conditioning systems have external heating elements to drive off excess moisture in the air and controls by which they are regulated.

This invention relates to air conditioning systems that usually do not have humidity control and wherein heat developed in compressing the refrigerant is wasted. This invention makes use of such heat of compression in either water cooled or air cooled systems and employs it to dehumidify the conditioned space.

The object of my invention is to make use of the heat of compression, which customarily is wasted, to control humidity in the conditioned space and by the inter-relationship between the temperature and humidity controls maintain a desired humidity as well as temperature level within the space. Another object is to accomplish the desired result in an economical manner and with a minimum number of parts added to the conventional air conditioning unit. A further object is to provide humidity and temperature control within prescribed ranges with the elimination of the possibility of mistake or error.

In the drawings in which the same number refers to the same or a similar part:

Figure 1:
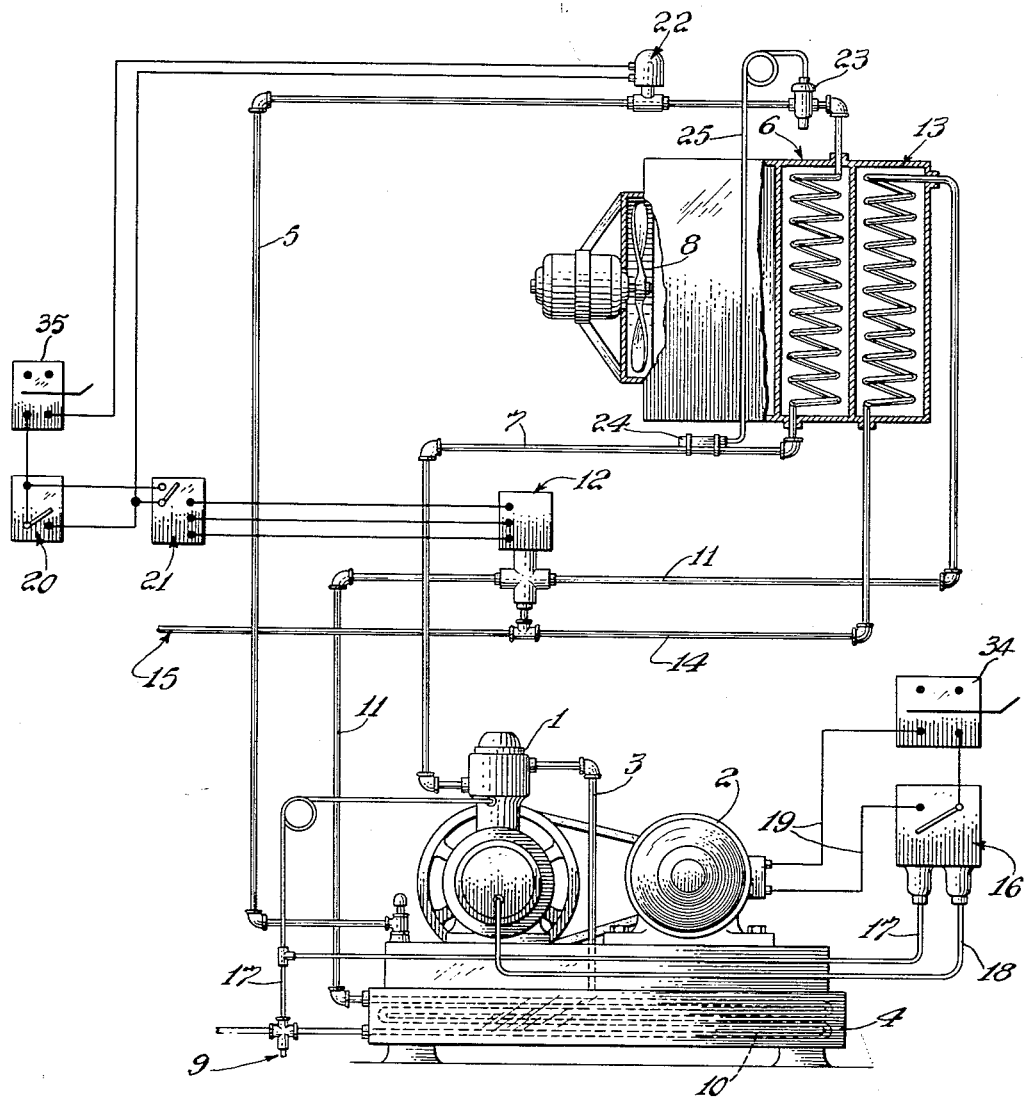
Figure 1 is a diagram of one embodiment of the invention in a water cooled air conditioning system.

Referring to Figure 1 the system consists of parts shown as follows:

Compressor 1, driven by motor 2, transmits a refrigerant under pressure through feed line 3, condenser 4, where the heat of compression is reduced, feed line 5, solenoid valve 22 and thermostatic expansion valve 23 to refrigerative evaporator 6 from which it flows through suction line 7 back to compressor 1. Fan 8 is located so as to drive air over the surfaces of evaporator 6 and into the space to be conditioned.

Water from an external source is admitted through regulating valve 9 to coil 10 in condenser 4. In most systems this water after circulating through coil 10 leaves the system for cooling and reuse, or, is discharged and wasted. However in the system shown in Figure 1 after leaving coil 10 the water passes through pipe 11, and modulating three way mixing valve 12. From here it may continue through pipe 11, heating coil 13, and then through pipe 14 leaving the system at outlet 15, or at mixing valve 12 it may be by-passed directly to outlet 15.

Conventional controls are shown in the diagram. A high-low pressure control 16 for starting and stopping motor 2 is connected to compressor 1 by high pressure line capillary tube 17 and low pressure line capillary tube 18. Electrical leads are shown as 19 connected to power supply switch 34 and control 16 respectively. Tube 17 also connects with water regulating valve 9.

Humidistat 20 and thermostat 21 located in the space to be conditioned are inter-connected with mixing valve 12 and solenoid valve 22. Control circuit switch 35 is connected to humidistat 20 and solenoid valve 22.

Clamped to suction line 7 is thermostatic control bulb 24, connected through capillary tube 25 to thermostatic expansion valve 23.

The operation of the illustrated system is as follows. To bring the space to be conditioned to desired temperature the auxiliary controls on thermostat 21 energize solenoid valve 22 allowing the refrigerant to flow through thermostatic expansion valve 23, through evaporator 6 and into the crank case of compressor 1. Pressure builds up in the crank case, actuating pressure control 16 and thus starting motor 2. Concurrently regulating valve 9 opens.

If the space is at a proper humidity level the humidistat 20 control circuit will be open and remain so. When the temperature in the space has been reduced to the setting of thermostat 21, the circuit to solenoid valve 22 will be broken and the valve shut. With the falling off of pressure in the crank case of compressor 1, pressure control 16 will function and stop motor 2. With pressure decrease in tube 17, regulating valve 9 will close. During such a cycle the heated condenser water from coil 10 will pass through mixing valve 12 directly to outlet 15.

If the humidity in the space is higher than the setting of humidistat 20, its control circuit will be closed and humidistat 20 will continue to energize solenoid valve 22 even after thermostat 21 ceases to do so and the temperature of evaporator 6 will continue to drop. The lowering of the space temperature will cause thermostat 21 to change the positioning of mixing valve 12 allowing some of the heated condenser water to flow to heating coil 13 instead of directly to outlet 15. This will cause air passing over evaporator 6 to be partially reheated until the original thermostat setting is satisfied.

The reduction of humidity is thus accomplished by reducing the temperature of the air to less than that desired and condensing out more moisture than would be the case at the desired temperature. Thereafter the air is reheated to the desired temperature without restoration of the moisture.

When by the foregoing cycle the humidity of the air is reduced sufficiently to satisfy the setting of humidistat 20, the circuit to solenoid valve 22 will be broken and motor 2 stopped.

Figure 2:
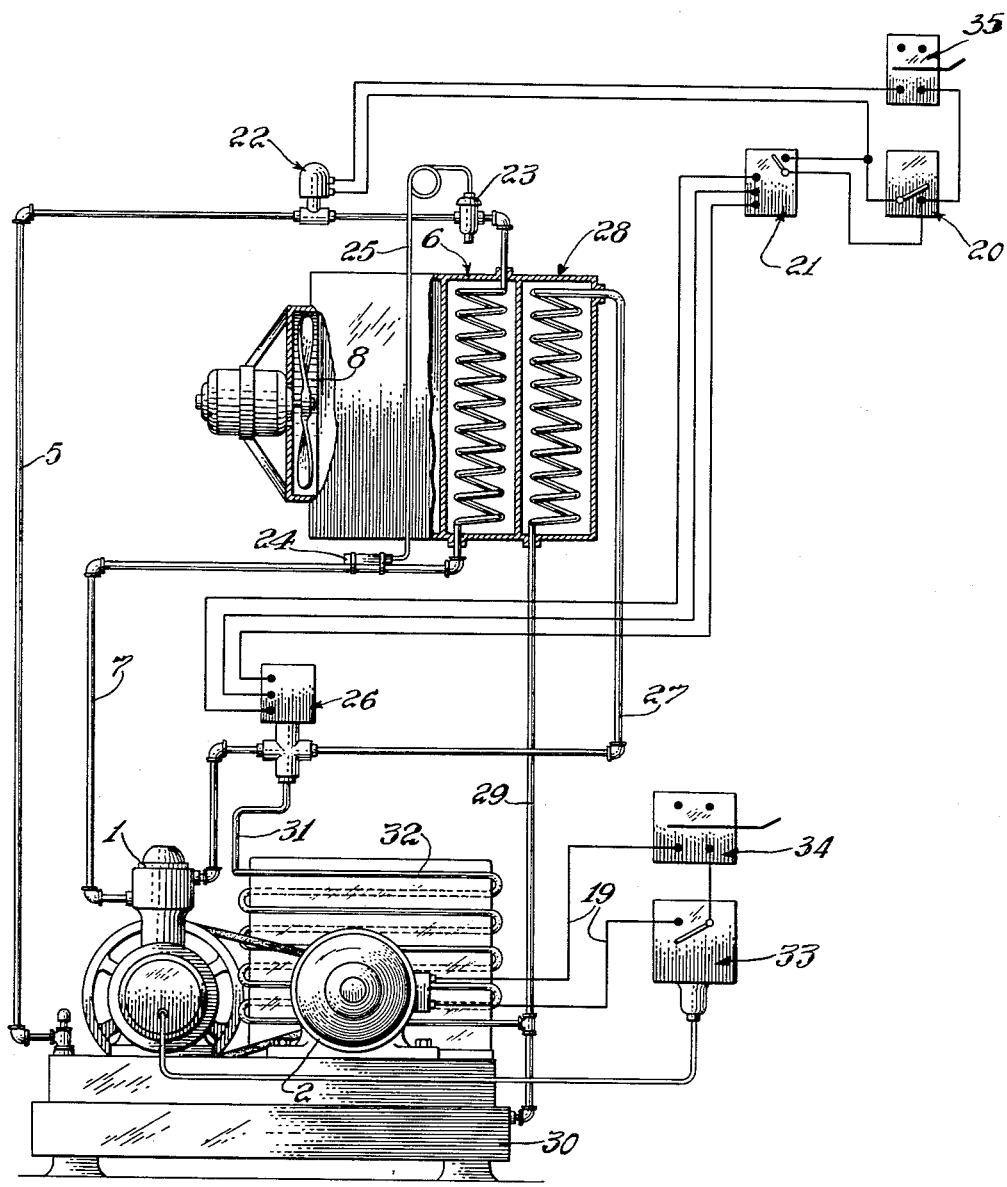
Figure 2 is a diagram of one embodiment of the invention in an air cooled air conditioning system.

In Figure 2 a diagram of an air cooled system embodying this invention is shown with each part common to it and the water cooled system bearing the same number. It operates as does the water cooled system, except that the refrigerant after returning to compressor 1 and being compressed is used for space reheating purposes. It may, from compressor 1 be diverted from pipe 31 and cooling coil 32 by modulating three way mixing valve 26 through pipe 27 and heating coil 28 and thence through pipe 29 to the reservoir 30.

Thus the operation of the system shown in Figure 2 is as follows:

Thermostat 21 functions causing solenoid valve 22 to open in permitting the refrigerant to flow through pipe 5 passed thermostatic expansion valve 23 through evaporator 6 and into the crank case of compressor 1. Pressure builds up in the crank case actuating pressure control 33 thus starting motor 2.

If the space is at a proper humidity level the humidistat 20 control circuit will be open and remain so. Thus when the temperature in the space has been reduced to the setting of thermostat 21 the circuit to solenoid valve 22 will be broken and the valve shut. The pressure in the crank case of compressor 1 will fall off and motor 2 stop.

If the humidity in the space is higher than the setting of humidistat 20 its control circuit will be closed and will continue to energize solenoid valve 22 even after thermostat 22 ceases to do so. The temperature of evaporator 6 will thereupon continue to drop and the lowering air temperature will actuate mixing valve 26 allowing some of the hot gas to pass directly from compressor 1 through pipe 27 thence through heating coil 28 before being returned to reservoir 30. Heating coil 28 is positioned next to evaporator 6 and will partially reheat the cool air that has passed over evaporator 6.

When the air has been partially reheated and its humidity reduced sufficiently to satisfy the humidistat the solenoid valve circuit will open and the system come to a stop.

Many modifications may be made in the described invention and the foregoing is intended to be illustrative only and in nowise limiting the scope of the invention.

What I claim is:

An air conditioning system comprising in combination, a refrigerant; a compressor; an evaporator about which air to be conditioned is circulated; a water cooled condenser; a solenoid valve adapted to admit the refrigerant to the evaporator; a thermostat and a humidistat operably connected with the solenoid valve and adapted to keep the same open until each is satisfied; a heating coil positioned in the path of the air passed over the evaporator; a conduit, incorporating a modulating three way mixing valve, interposed between the water outlet of the condenser and the water discharge outlet of the system and connected with the inlet of the heating coil, the said valve being responsive to the thermostat and adapted to admit water to the heating coil until the thermostat is satisfied.

References Cited in the file of this patent

UNITED STATES PATENTS

| | | |
|---|---|---|
| 1,837,798 | Shipley | Dec. 22, 1931 |
| 2,172,877 | Parcaro | Sept. 12, 1939 |
| 2,206,445 | Beeler | July 3, 1940 |
| 2,272,099 | Smith | Feb. 3, 1942 |
| 2,274,152 | McGrath | Feb. 24, 1942 |
| 2,283,386 | Newton | May 19, 1942 |
| 2,286,538 | Guler | June 16, 1942 |
| 2,301,725 | Wile | Nov. 10, 1942 |
| 2,515,842 | Swinburne | July 18, 1950 |